United States Patent
Wu et al.

(10) Patent No.: US 6,288,807 B1
(45) Date of Patent: *Sep. 11, 2001

(54) OPTICAL WAVELENGTH ROUTER

(75) Inventors: Kuang-Yi Wu; Jian-Yu Liu, both of Boulder, CO (US)

(73) Assignee: Chorum Technologies LP, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/659,524

(22) Filed: Sep. 12, 2000

Related U.S. Application Data

(63) Continuation of application No. 09/411,935, filed on Oct. 4, 1999, now Pat. No. 6,137,606, which is a continuation of application No. 09/240,550, filed on Jan. 29, 1999, now Pat. No. 5,978,116, which is a continuation of application No. 08/739,424, filed on Oct. 29, 1996, now Pat. No. 5,867,291.

(51) Int. Cl.[7] ............... H04J 14/02; H04J 14/06
(52) U.S. Cl. ............................. 359/122; 359/127
(58) Field of Search ................. 359/122, 124, 359/127, 128

(56) References Cited

U.S. PATENT DOCUMENTS

| | | |
|---|---|---|
| 4,566,761 | 1/1986 | Carlsen et al. . |
| 4,685,773 | 8/1987 | Carlsen et al. . |
| 4,919,522 | 4/1990 | Nelson . |
| 5,136,671 | 8/1992 | Dragone . |
| 5,363,228 | 11/1994 | DeJule et al. . |
| 5,381,250 | 1/1995 | Meadows . |
| 5,414,541 | 5/1995 | Patel et al. . |

(List continued on next page.)

OTHER PUBLICATIONS

Ammann, "Synthesis of Electro–Optic Shutters havin g a Prescribed Transmission vs Voltage Characteristics", Journal of the Optical Society of America (vol. 56, No. 8, pp. 1081–1088, Aug. 1966).

Harris et al., "Optical Network Synthesis Using Birefringent Crystals, *I. Synthesis of Lossless Networks of Equal–Length Crystals", Journal of the Optical Society of America (vol.54, No. 10, pp. 1267–1279, Oct. 1964).

Senior et al., "Devices for Wavelength–Multiplexing and Demultiplexing", IEE Proceedings (vol. 136, Pt. J, No. 3, Jun. 1989).

Nosu et al., "Optical FDM Transmission Technique", Journal of Lightwave Technology (vol. LT–5, No. 9, Sep. 1987).

Inoue et al., "A Four–Channel Optical Waveguide Multi/Demultiplexer foe 5–GHz Spaced Optical FDM Transmission", Journal of Lightwave Technology (vol. 6, No. 2, Feb. 1988).

(List continued on next page.)

*Primary Examiner*—Leslie Pascal
(74) *Attorney, Agent, or Firm*—Dorr, Carson, Sloan & Birney, P.C.

(57) ABSTRACT

A programmable wavelength router having a plurality of cascaded stages where each stage receives one or more optical signals comprising a plurality of wavelength division multiplexed (WDM) channels. Each stage divides the received optical signals into divided optical signals comprising a subset of the channels and spatially positions the divided optical signals in response to a control signal applied to each stage. Preferably each stage divides a received WDM signal into two subsets that are either single channel or WDM signals. A final stage outputs optical signals at desired locations. In this manner, $2^N$ optical signals in a WDM signal can be spatially separated and permuted using N control signals.

33 Claims, 9 Drawing Sheets

U.S. PATENT DOCUMENTS

| | | |
|---|---|---|
| 5,488,500 | 1/1996 | Glance . |
| 5,596,661 | 1/1997 | Henry et al. . |
| 5,606,439 | 2/1997 | Wu . |
| 5,680,490 | 10/1997 | Cohen et al. . |
| 5,694,233 * | 12/1997 | Wu et al. .............................. 359/117 |
| 5,809,190 | 9/1998 | Chen . |
| 5,867,291 * | 2/1999 | Wu et al. .............................. 359/124 |
| 5,912,748 * | 6/1999 | Wu et al. .............................. 359/117 |
| 5,978,116 * | 11/1999 | Wu et al. .............................. 359/124 |
| 6,005,518 * | 8/2000 | Wu et al. .............................. 359/117 |
| 6,097,518 * | 8/2000 | Wu et al. .............................. 359/128 |
| 6,137,606 * | 10/2000 | Wu et al. .............................. 359/124 |

OTHER PUBLICATIONS

P. Melman et al., Tunable Birefringent Wavelength–Division Multiplexer/Demultiplexer, Electronics Letters, The Institute of Electrical Engineers Publishing & Information Services Jul. 1995.

W.J. Carlsen et al., Flat Passband Birefringent Wavelength–Division Multiplexers, Nov. 1996.

Yohji Fujii et al., Wavelength–Division Multi/Demultiplexer Utilizing Optically Active Crystals, Journal of Lightwave Technology Technology, Jul. 1990, pp. 1051–1054, vol. 8, No. 7, IEEE.

Hideki Ishio et al., Review and Status of Wavelength–Division–Multiplexing Technology and Its Application, Journal Lightwave Technology, Aug. 1984, pp. 448–463, vol. LT–2, No. 4, IEEE.

H. F. Manhlein, Fiber–Optic Communication in the Wavelength–Division Multiplex Mode, Fiber and Intrgrated Optics, 1983, pp. 339–373, vol. 4, No. 4, Crane, Russak & Co., Inc.

* cited by examiner

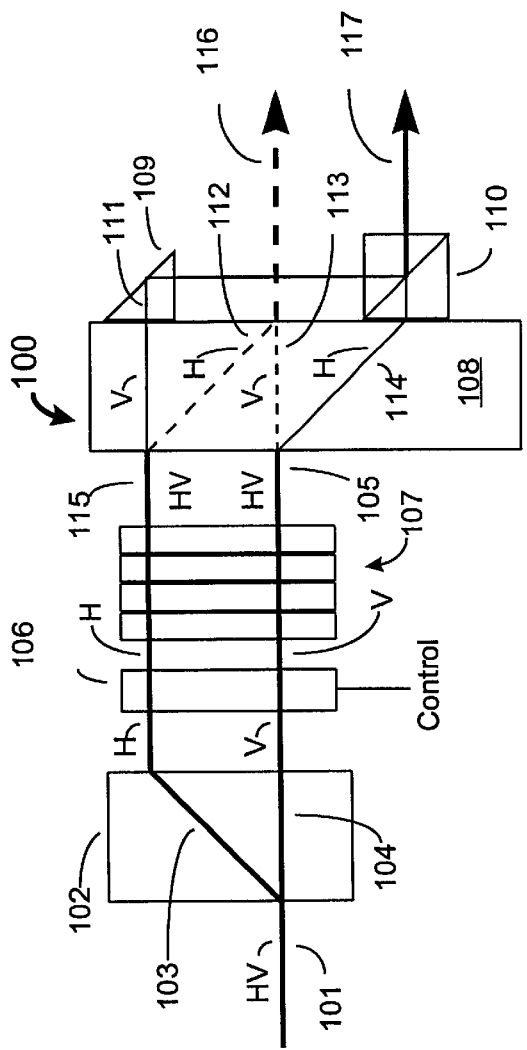
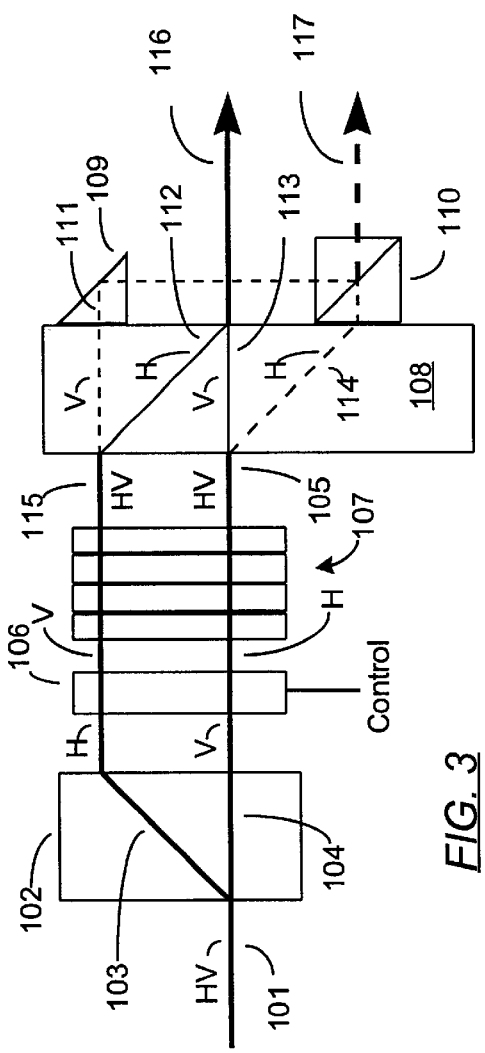
FIG. 2
FIG. 3

OPTICAL WAVELENGTH ROUTER

RELATED APPLICATION

This application is a continuation of U.S. patent application Ser. No. 09/411,935, filed on Oct. 4, 1999, now U.S. Pat. No. 6,137,606, issued on Oct. 24, 2000, which is a continuation of U.S. patent application Ser. No. 09/240,550, filed on Jan. 29, 1999, now U.S. Pat. No. 5,978,116, issued on Nov. 2, 1999, which is a continuation of U.S. patent application Ser. No. 08/739,424, filed on Oct. 29, 1996, now U.S. Pat. No. 5,867,291, issued on Feb. 2, 1999.

GOVERMENT INTERESTS

The invention was made with Government support under Contract DARPA I: DAAH01-96-C-R263 awarded by U.S. Army Missile Command, AMSMI-AC-CRAY, Redstone Arsenal, Ala. 35898. The Government has certain rights in the invention.

BACKGROUND OF THE INVENTION

1. Field of the Invention

The present invention relates, in general, to communication systems, and, more particularly, to a programmable wavelength router for wavelength division multiplex (WDM) optical communication.

2. Statement of the Problem

Although optical fiber has very broad transmission bandwidth on the order of 10–20 THz, the system data rates transmitted over the fiber are presently limited to the modulation rate of the electrooptic modulators for single-channel communication using typical optical sources such as wavelength-tuned distributed feedback lasers. Information communication efficiency over an optical fiber transmission system can be increased by optical wavelength division multiplexing (WDM). WDM systems employ signals consisting of a number of different wavelength optical signals, known as carrier signals or channels, to transmit information on an optical fiber. Each carrier signal is modulated by one or more information signals. As a result, a significant number of information signals may be transmitted over a single optical fiber using WDM technology.

Despite the substantially higher fiber bandwidth utilization provided by WDM technology, a number of serious problems must be overcome if these systems are to become commercially viable. For example, multiplexing, demultiplexing, and routing optical signals. The addition of the wavelength domain increases the complexity for network management because the processing now involves both filtering and routing. Multiplexing involves the process of combining multiple channels each defined by its own frequency spectrum into a single WDM signal. Demultiplexing is the opposite process in which a single WDM signal is decomposed into the individual channels. The individual channels are spatially separated and coupled to specific output ports. Routing differs from demultiplexing in that a router spatially separates the input optical channels into output ports and permutes these channels according to control signals to a desired coupling between an input channel and an output port.

One prior approach to wavelength routing has been to demultiplex the WDM signal into a number of component signals using a prism or diffraction grating. The component signals are each coupled to a plurality of 2×2 optical switches which are usually implemented as opto-mechanical switches. Optionally a signal to be added to the WDM signal is also coupled to one of the 2×2 switches. One output of each 2×2 optical switches coupled to a retained output multiplexer which combines the retained signals, and including the added signal, and couples them into a retained signal output port. A second signal for each 2×2 optical switch is coupled to a dropped signal multiplexer. By proper configuration of the optical switches, one signal can be coupled to the dropped signal output port, all the remaining signals pass through the retained signal output port. This structure is also known as a add-drop optical filter. The structure is complicated, relies on opto-mechanical switches, and interconnections tend to be difficult.

A "passive star" type of wavelength space switch has been used in some WDM networks, for example the LAMBDA-NET and the RAINBOW network. This passive star network has the broadest capability and the control structure and this implementation is notably simple. However, the splitting loss of the broadcast star can be quite high when the number of users is large. Also, the wavelength space switches used are based on tunable filters either Fabry-Perot type or acousto-optic based filters, which typically have narrow resonant peak or small side lobe compression ratio.

A third type of wavelength selectable space switch is shown in U.S. Pat. 5,488,500 issued to Glance. The Glance filter provides the advantage of arbitrary channel arrangement but suffers significant optical coupling loss because of the two array waveguide grading demultiplexers and two couplers used in the structure.

Another problem with prior approaches and with optical signal processing in general is high cross-talk between channels. Cross-talk occurs when optical energy from one channel causes a signal or noise to appear on another channel. Cross-talk must be minimized to provide reliable communication. Also, filters used in optical routing are often polarization dependent. The polarization dependency usually causes higher cross-talk as optical energy of particular polarization orientations may leak between channels or be difficult to spatially orient so that it can be properly launched into a selected output port. Similarly, optical filters provide imperfect pass band performance in that they provide too much attenuation or signal compression at side lobes of the pass band is not high enough. All of these features lead to imperfect or inefficient data communication using optical signals. What is needed is a routing structure that provides low cross-talk to eliminate the unnecessary interference from other channels in a large network, a flat pass band response in the optical spectrum of interest so that the wavelength router can tolerate small wavelength variations due to the laser wavelength drift, polarization insensitivity, and moderate to fast switching speed for network routing. Also, a router with low insertion loss is desirable so the router minimally impacts the network and limits the need for optical amplifiers.

3. Solution to the Problem

These and other problems of the prior art are solved by a digitally programmable wavelength router that can demultiplex any number of channels from a WDM signal and simultaneously spatially separate the channels and perform wavelength routing. Using optical switching elements to conventional logic level signals provides rapid switching and minimum power consumption during operation. Employing filters with wide flat band spectral response limits distortion and signal attenuation while providing desirable channel selectivity. Reliable low cross-talk routing is achieved with high immunity to polarization of the incoming WDM signal or any of the channels in the incoming WDM signal. By using a scaleable design, any number of channels can be placed in the WDM signal depending on the transmitter/detector technology and the optical fiber available.

SUMMARY OF THE INVENTION

Briefly stated, the present invention involves a programmable wavelength router having a plurality of cascaded stages where each stage receives one or more optical signals comprising a plurality of wavelength division multiplexed (WDM) channels. Each stage divides the received optical signals into divided optical signals comprising a subset of the channels and spatially positions the divided optical signals in response to a control signal applied to each stage. Preferably each stage divides a received WDM signal into two subsets that are either single channel or WDM signals. A final stage outputs multiplexed optical signals at desired locations. In this manner, $2^N$ optical signals in a WDM signal can be spatially separated and routed to $2^N$ output lines using N control signals.

BRIEF DESCRIPTION OF THE DRAWING

FIG. 2 and FIG. 3 illustrate in simplified schematic form a portion of a router in accordance with the present invention;

DETAILED DESCRIPTION OF THE DRAWING

1. Overview

Figure 1:
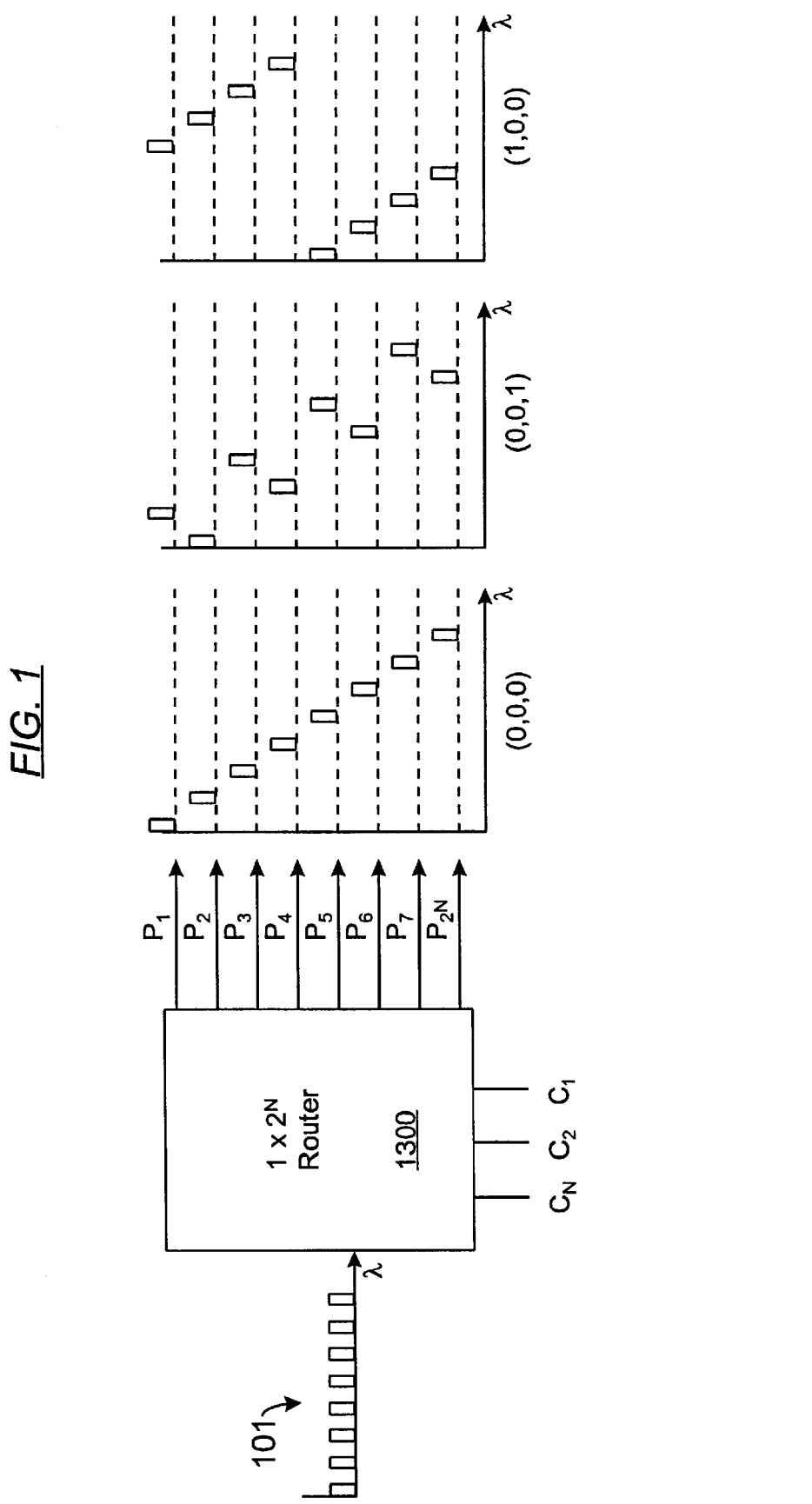
FIG. 1 illustrates in block diagram form the functionality of the optical router in accordance with the present invention.

The preferred implementation of the present invention both demultiplexes (i.e., spectrally separates) and routes (i.e., spatially permutates) a wavelength division multiplexed (WDM) optical signal. FIG. 1 illustrates in block diagram form the general funtionality of the present invention. A WDM signal 101 comprising multiple channels each channel with its own range of wavelengths or frequencies. As used herein, the term "channel" refers to a particular range of frequencies or wavelengths that define a unique information signal. Each channel is ideally evenly spaced from adjacent channels, although this is not necessary. Uneven spacing may result in some inefficiency or complexity in design, but, as will be seen, the present invention can be adapted to such a channel system. This flexibility is important in that the channel placement is driven largely by the technical capabilities of transmitters (i.e., laser diodes) and detectors and so flexibility is of significant importance.

It should be understood that a full permutation routing of N channels would require N! possible output permutations which is not practical. As used herein, the term permutation includes partial or incomplete permutation that is commonly used in signal routing. Desirably, each of the multiplexed input channels can be selectively routed to any of the available output lines and all of the input channels can be placed on some line. This requires that the router include at least the same number of outputs as the number of channels in the input signal, unless some of the output signals remain multiplexed as they leave the router. The present invention is scaleable and so supports a greater number of output lines than the number of input channels in the multiplexed input signal. In such cases, some of the output lines will not carry any signal which increases routing flexibility but is a less efficient use of hardware. These and other equivalent variations from the specific examples described herein are considered equivalents to the wavelength router in accordance with the present invention.

The WDM signal is fed as an input using conventional optical signal coupling techniques to $1 \times 2^N$ router 1300. Router 1300 receives N control signals $C_1$–$C_N$. In the particular example N is 3, however any number of control signals can be received by router 1300 due to the highly scaleable nature of the present invention. Router 1300 generates $2^N$ unique output signals on output ports $P_1$–$P_2^N$ such as optical fibers or other suitable optical transmission means.

Router 1300 serves to spatially separate each channel in WDM signal 101. Each channel is programmably placed on one of the output ports as selected by the configuration bits $C_1$–$C_N$. In a preferred embodiment, configuration bits $C_1$–$C_N$ are conventional TTL compatible logic-level signals allowing easy integration with conventional electronic systems. The three output diagrams shown in FIG. 1 are examples of channel locations output on each of the eight output ports of router 1300. For ease of discussion, the eight channels in WDM signal 101, as shown separately in FIG. 1, will be referred to as channel 1–8 with channel 1 being the lowest wavelength and channel 8 being the highest wavelength grouping. With a (0,0,0) input on configuration bits $C_1$–$C_N$ the lowest wavelength channel (i.e., channel 1) is coupled to output port $P_1$. In the first configuration, channel 1 is presented to output port $P_1$, channel 2 to output port $P_2$, and channel 8 to output port $P_2^N$. In contrast when the configuration bits are set to (0,0,1) channel 2 is coupled to output port $P_1$, channel 1 is coupled to output port $P_2$ and the remaining channels are coupled as shown in FIG. 1. Similarly, when the configuration bits are set to (1,0,0) channel 1 is coupled to port $P_5$, channel 2 to port $P_6$, channel 3 to port $P_7$ and channel 4 to port $p_2^N$ and the remaining channels are coupled as shown in FIG. 1. Table 1 illustrates all of the couplings possible with router 1300. It can be seen that control bits $C_1$–$C_N$ offer routing functionality such that $2^N$ combinations (i.e., eight combinations when N=3) of channel routing can be achieved.

TABLE 1

| Control State $(C_3,C_2,C_1)$ | Spectral Response $(P_1-P_2^N)$ | Control State $(C_3,C_2,C_1)$ | Spectral Response $(P_1-P_2^N)$ |
|---|---|---|---|
| (0,0,0) | 1,2,3,4,5,6,7,8 | (1,0,0) | 5,6,7,8,1,2,3,4 |
| (0,0,1) | 2,1,4,3,6,5,8,7 | (1,0,1) | 6,5,8,7,2,1,4,3 |
| (0,1,0) | 3,4,1,2,7,8,5,6 | (1,1,0) | 8,7,5,6,3,4,1,2 |
| (0,1,1) | 4,3,2,1,8,7,6,5 | (1,1,1) | 7,8,6,5,4,3,2,1 |

Although channels 1–8 are illustrated as evenly spaced, the channels may be unevenly spaced or one or more channels may be missing if transmitter/detectors are unavailable or the channel is not needed. The channels may also be more closely spaced. More or less channels may be provided. Current systems are implemented with up to eight WDM channels in signal 101 and sixteen and sixty-four channel optical transceivers are available.

2. Basic Channel Routing Element

FIG. 2 and FIG. 3 illustrate a basic channel routing element 100 in schematic form in two control positions. In accordance with the preferred embodiment, each basic element is under binary control from one of control bits $C_1-C_N$ and hence, has two states. Each basic element 100 serves to separate various portions of the frequency spectrum applied to an input port to select which of two output ports each of the separated signals are coupled to. As discussed later, these basic elements are cascaded to form the $1 \times 2^N$ router 1300 in accordance with the present invention.

In FIG. 2 and FIG. 3, bold solid lines indicate optical paths that comprise the full spectrum of channels in the WDM input signal 101. Solid thin lines indicate optical paths of signals comprising a first subset of channels. Thin dashed lines indicate optical channels comprising a second subset of channels. It is important to understand that each of the subsets may comprise more than one channel and may itself be a WDM signal although having a smaller bandwidth than the original WDM signal 101. Each of the lines are labeled as H indicating horizontal polarization, V indicating vertical polarization, or HV indicating mixed horizontal and vertical polarization in the optical signal at that point.

WDM signal 101 enters a birefringent element 102 that spatially separates horizontal and vertically polarized components of signal 101. Birefringent element 102 comprises a material that allows the vertically polarized portion of the optical signal to pass through without changing course because they are ordinary waves in element 102. In contrast, horizontally polarized waves are redirected at an angle because of the birefringent walk-off effect. The angle of redirection is a well-known function of the particular materials chosen. Examples of materials suitable for construction of the birefringent elements used in the preferred embodiments include calcite, rutile, lithium niobate, $YVO_4$ based crystals, and the like. The horizontal component travels along path 103 as an extraordinary signal in birefringent element 102 while vertical component 104 travels as an ordinary signal and passes through without spatial reorientation. Signals 103 and 104 both comprise the full spectrum of WDM signal 101.

Both the horizontally and vertically polarized components 103 and 104 are coupled to a programmable polarization rotator 106 under control of a control bit such as $C_1-C_N$ shown in FIG. 1. Polarization rotator 106 serves to selectively rotate the polarization state of each of signals 103 and 104 by a predefined amount. In the preferred embodiment, rotator 106 rotates the signals by either 0° (i.e., no rotation) or 90°. The polarization converter or rotator 106 comprises one or more types of known elements including twisted nematic liquid crystal rotators, ferroelectric liquid crystal rotators, pi-cell based liquid crystal rotators, magneto-optic based Faraday rotators, acousto-optic and electro-optic based polarization rotators. Commercially available rotators having liquid crystal based technology are preferred, although other rotator technologies may be applied to meet the needs of a particular application. The switching speed of these elements ranges from a few milliseconds to nanoseconds, therefore can be applied to a wide variety of systems to meet the needs of a particular application. These and similar basic elements are considered equivalents and may be substituted and interchanged without departing from the spirit of the present invention.

FIG. 2 illustrates the condition where the signals are rotated by 0° such that the signals exiting rotator 106 do not change polarization. FIG. 3 illustrates the second case where polarization is rotated by 90° and the horizontally polarized component entering rotator 106 exits vertical polarization and the vertically polarized component exits with horizontal polarization. Again, at this stage, both the horizontal and vertical components comprise the entire spectrum of channels in WDM signal 101.

Element 107 comprises a plurality of birefringent waveplates (107a–107n in FIG. 15) at selected orientations. By placing element 107 between the two polarizers, namely 102 and 108, the combination becomes a polarization interference filter that serves to pass selected frequencies with horizontal polarization and a complimentary set of frequencies with vertical polarization. Ideally, the polarization interference filter has a comb filter response curve with substantially flat top or square wave spectral response. The polarization interference filter is sensitive to the polarization of the incoming optical signal. The spectral response to a horizontally polarized input signal when viewed at the same output point of birefringent element 108 is complimentary to the spectral response of a vertically polarized input signal. The details of construction of element 107 is described more fully in reference to FIG. 15.

Optical signals 105 and 115 are coupled to birefringent element 108. Birefringent element 108 has similar construction to birefringent element 102 and serves to spatially separate horizontally and vertically polarized components of the input optical signals 105 and 115. As shown in FIG. 2, optical signal 115 is broken into a vertical component 111 comprising the first set of channels and a horizontal component 112 comprising the second set of frequencies. Similarly, optical signal 105 is broken down into a vertical component 113 comprising the second set of frequencies and a horizontal component 114 comprising the first set of frequencies.

The geometry of birefringent element 108 is selected such that the horizontal component 112 joins with the vertical component 113 and is output as optical signal 116 comprising the second set of frequencies. Optical signal 116 includes both horizontal and vertical components. Optical combining means 109 and 110 serve to combine the vertical component 111 with the horizontal component 114 to produce an output signal 117 comprising the first set of frequencies. Combining elements 109 and 110 can take a variety of known forms including a retro-reflector, mirror, prism, or other optical signal combining means. Output signals 116 and 117 must be physically aligned with an output port such as an optical fiber or a subsequent optical processing element.

In contrast, in FIG. 3 the vertical component 111 comprises the second set of channels while the horizontal channel 112 comprises the first set of channels. Likewise, the vertical component 113 comprises the first set of channels and the horizontal component 114 comprises the second set of channels. Combining means 109 and 110 operate in a manner similar to that described in FIG. 2 to provide a first output signal 116 comprising the first set of frequencies and a second output signal 117 comprising the second set of frequencies. In this manner, a single control signal applied, to rotator 106 optically routes the subdivided WDM input signal.

Figure 4:
FIG. 4 illustrates a spectral diagram of wavelength versus energy of a WDM signal.
Figure 6:
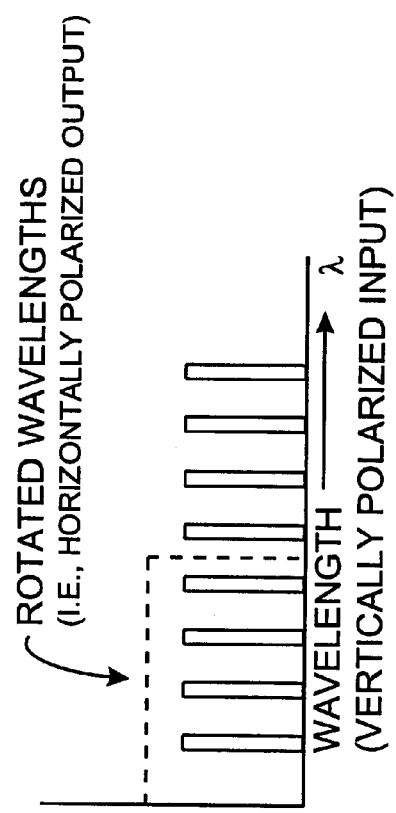
FIG. 6 illustrates a spectral diagram of an intermediate optical signal resulting from vertically polarized input.
Figure 5:
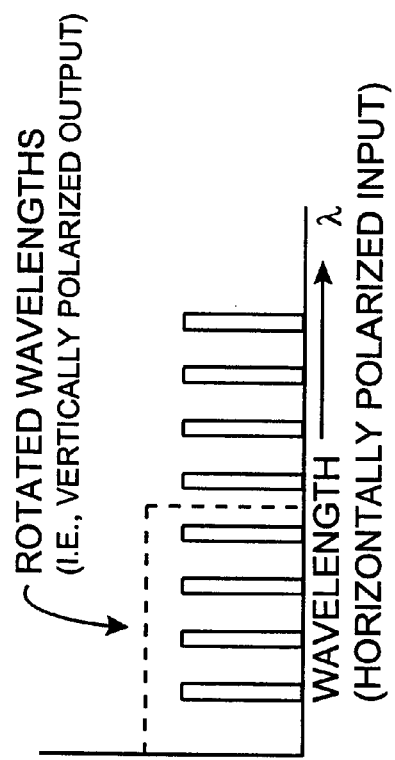
FIG. 5 illustrates a spectral diagram of an intermediate signal resulting from horizontally polarized input energy.

The wavelength selection functionality of the apparatus shown in FIG. 2 and FIG. 3 is best understood with reference to the spectrum diagrams shown in FIG. 4–FIG. 6. FIG. 4 illustrates eight channels making up WDM signal 101. In FIG. 4–FIG. 6, wavelength is illustrated on the horizontal axis while signal amplitude is illustrated on the vertical axis. While each channel is illustrated as a neatly separated square, it should be understood that in practice that the channels may comprise a range of frequencies having various amplitudes throughout the range of frequencies. The particular range of frequencies may be larger or smaller than shown in FIG. 4. In FIG. 5, the functionality of horizontally polarized input of the stacked birefringent waveplates 107 (shown in FIG. 2) is illustrated. The dashed line box indicates the portion of the horizontally polarized input that is passed with vertical polarization. The portion of the signal outside of the dashed line box is passed with horizontal (i.e., non-rotated) orientation. Hence, as shown in FIG. 5 channels 1–4 exit with vertical polarization if they enter stacked birefringent waveplates 107 with horizontal polarization. Conversely, channels 5–8 exit stacked birefringent waveplates 107 with horizontal polarization if they enter with horizontal polarization.

FIG. 6 illustrates a spectrum diagram when the input to stacked birefringent waveplates 107 has vertical polarization. This is shown in FIG. 2 by the lower signal and in FIG. 3 by the upper signal exiting rotator 106. The dashed line indicates rotated wavelengths (i.e., wavelengths that will exit stacked birefringent waveplates 107 with horizontal polarization). As shown in FIG. 6, channels 1–4 are rotated and exit stacked birefringent waveplates 107 with horizontal polarization while channels 5–8 are not rotated and exit with their original vertical polarization. In this manner, distinct sets of frequencies can be distinguished although they still travel in the same optical paths 105 and 115 shown in FIG. 2 and FIG. 3. The construction of a filter to accomplish the function shown by the dotted line in FIG. 5 and FIG. 6 will be described in greater detail hereinafter.

Figure 7:
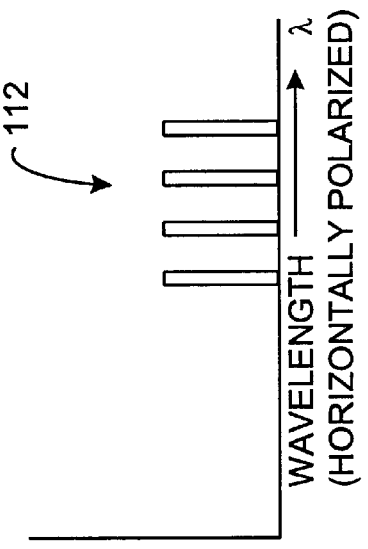
FIG. 7–FIG. 10 illustrate spectral diagrams of various horizontal and vertically polarized intermediate signals after filtering in accordance with the present invention.
Figure 8:
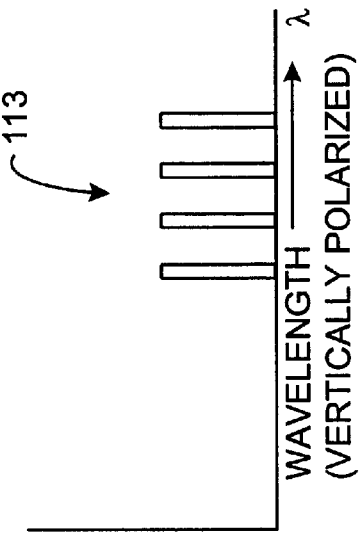
Figure 9:
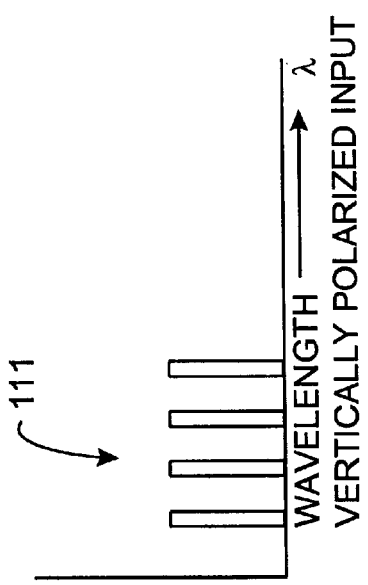
Figure 10:
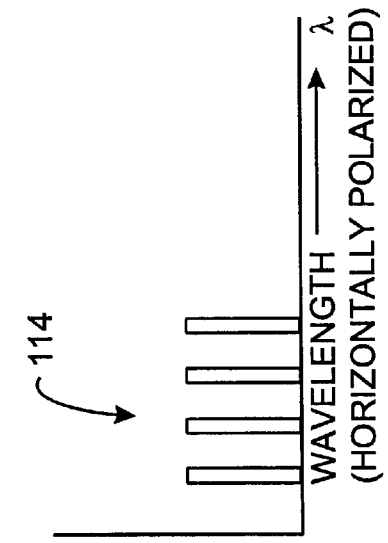

FIG. 7–FIG. 10 illustrate the various components as they are separated in birefringent element 108. FIG. 7 shows the vertically polarized component 111 comprising channels 1–4. If the control signal applied to rotator 106 were inverted, signal 111 would comprise vertically polarized components of channels 5–8. In FIG. 8, component 112 comprises horizontally polarized portions of channels 5–8 while if the control bit were inverted, signal 112 would comprise the horizontally polarized components of channels 1–4. FIG. 9 illustrates signal 114 which comprises the horizontally polarized component of channels 1–4 while the inverse would be true if the control bit were inverted. Likewise, in FIG. 10, signal component 113 comprises the vertically polarized portions of channels 5–8 while if the configuration bit were inverted component 113 would comprise the vertically polarized components of channels 1–4.

Signals 111 and 114 are optically combined as illustrated in FIG. 2 to form output signal 117 comprising the horizontally and vertically polarized components of channels 1–4. If the control bit were inverted, output signal 117 would comprise the horizontally and vertically polarized components of channels 5–8. Conversely, components 112 and 113 are optically combined as the exit birefringent element 108 to form output signal 116 comprising the horizontally and vertically polarized components of channels 5–8. If the control bit were inverted, output signal 116 would comprise the horizontally and vertically polarized components of channels 1–4.

Figure 12:
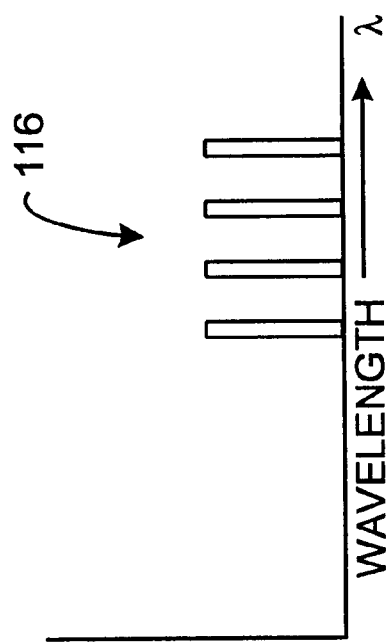
FIG. 11 and FIG. 12 illustrate spectral diagrams of the spatially separated and routed output signals in accordance with the present invention.
Figure 11:
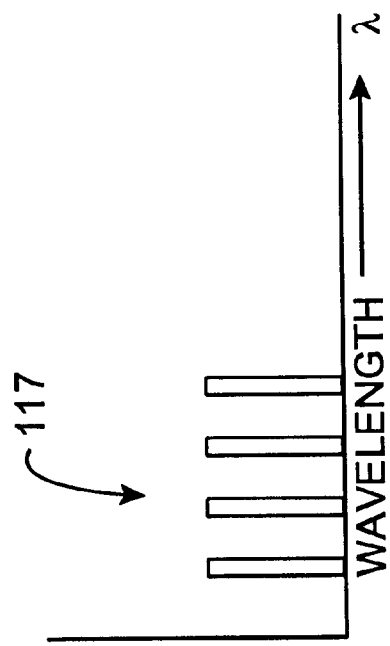

One feature in accordance with the present invention is that the routing is accomplished while conserving substantially all optical energy available in WDM signal 101. That is to say, regardless of the polarization of the signals in WDM signal 101 both the horizontal and vertically polarized components are used and recombined into output signal 116 and output signal 117 resulting in very low loss through router 1300 in accordance with the present invention. It should be noted from FIG. 11 and FIG. 12 that output signals 116 and 117 comprise more than one channel and so themselves are WDM signals. Routing groups of channels may be useful in some circumstances, however, the preferred embodiment of the present invention uses multiple stage design to further decompose WDM signals 116 and 117 as shown in FIG. 11 and FIG. 12 into individual channel components that are spatially separated.

3. Multi-stage Router

Figure 13:
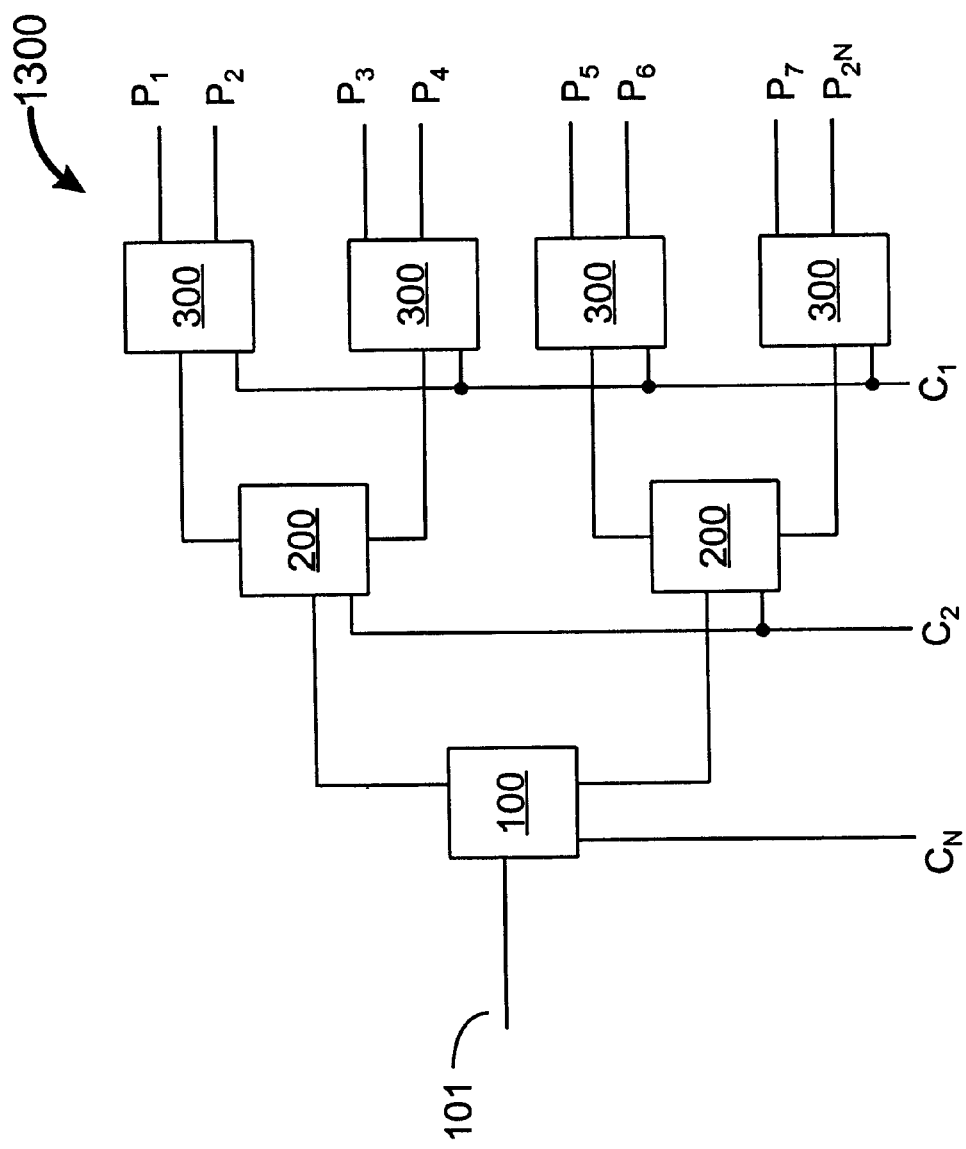
FIG. 13 illustrates in block diagram form a multi-stage programmable router in accordance with one embodiment of the present invention.

FIG. 13 illustrates in block diagram form router 1300 in accordance with the present invention. Router 1300 is a three-stage router each stage accepting one control bit $C_1$–$C_N$. First stage 100 comprises a single 1×2 router such as router 100 shown in FIG. 2 and FIG. 3. First stage 100 is responsible for dividing WDM signal 101 into two groups. Second stage 200 comprises two substantially identical routers that are similar to router 100 in stage 1. Routers 200 also divide the WDM signals received on lines 116 and 117 into two output signals. Routers 200 differ from router 100 in that the pass band of their polarization interference filter has narrower "tines" and more frequent tines. In a particular example, the pass band of stages 200 is half the width of the pass band of stage 100 and has twice the frequency. This is accomplished by adding additional waveplates or increasing the retardation of the waveplates in the element 107 shown in FIG. 2 and FIG. 3.

The third stage comprises four router elements 300 that are similar in construction to router elements 200 and 100 discussed above. Each output from stage 200 comprises two WDM channels. Each stage 300 further divides the two WDM channels that are received into two single channel outputs on outputs $P_1$–$P_2^N$. Each router element 300 is coupled to a single configuration bit $C_1$ which selects the binary state.

The cascaded design of binary router elements 100, 200, and 300 shown in FIG. 13 allows three control bits to implement any of $2^N$ routing arrangements of the WDM signal 101 onto outputs $P_1$–$P_2^N$. However, each of routing elements 100, 200, and 300 could be individually controlled or programmed or some may receive no configuration bit and have a fixed demultiplexing function to meet the needs of a particular application. These and other equivalent embodiments are contemplated and are within the scope and spirit of the present invention.

Figure 14:
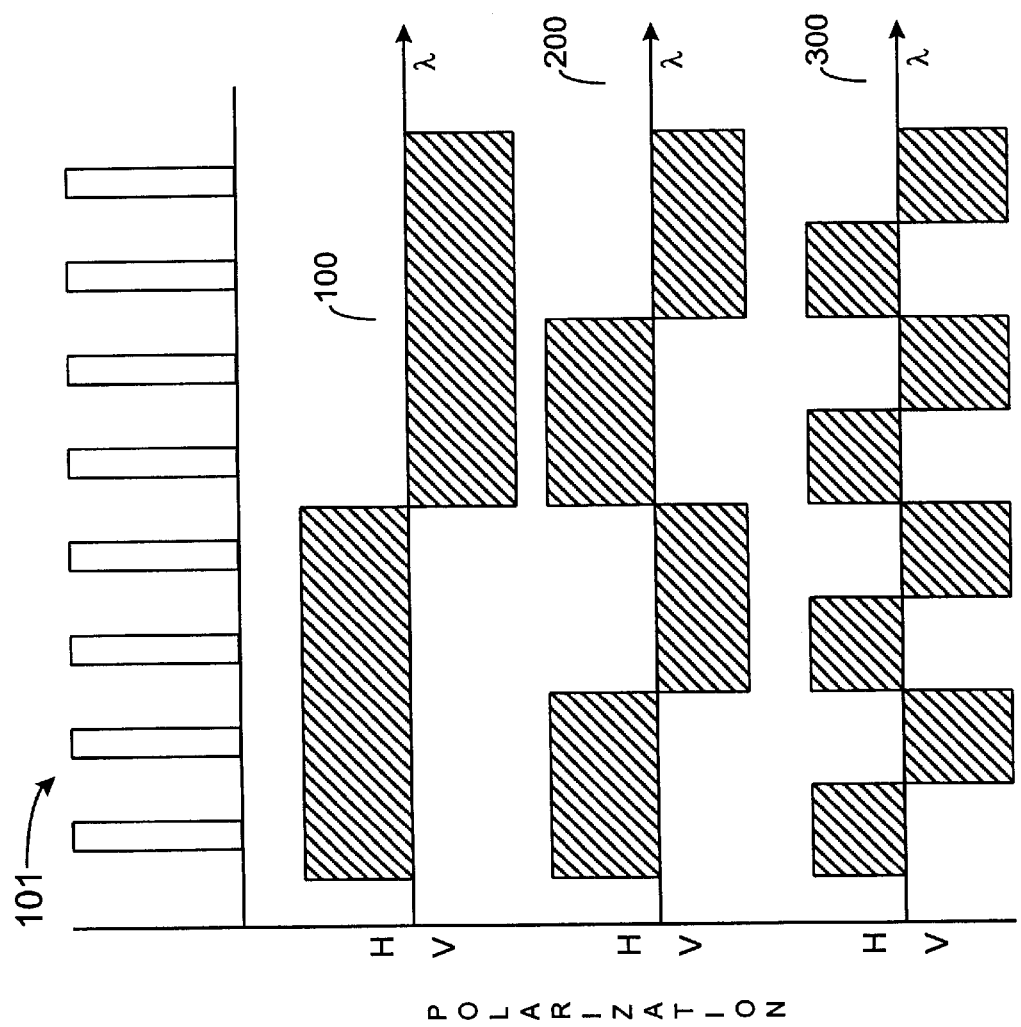
FIG. 14 illustrates spectral diagrams of the pass band of each stage of the multi-stage filter shown in FIG. 13.

FIG. 14 illustrates how the pass bands of router stages 100, 200, and 300 differ with respect to WDM signal 101 illustrated at the top of FIG. 14. As shown, a pass band of stage 100 indicated by the shaded portions in FIG. 14 passes channels 1–4 if they enter with horizontal orientation without changing the orientation. Optical energy that enters with vertical polarization into stage 100 will be passed without rotation if it was within channels 5–8. It is advantageous to have substantially flat pass band performance of each stage 100, 200, and 300 as shown in FIG. 14.

Turning now to stage 200 shown in FIG. 14 it can be seen that channels 1–2 and 5–6 are passed if they enter with horizontal polarization while channels 3–4 and 7–8 are passed if they enter with vertical polarization. The channels that are not passed are rotated to have the opposite polarization as described hereinbefore. Similarly, stage 300 defines a pass band in which channels 1, 3, 5, and 7 are passed with horizontal polarization and channels 2, 4, 6, and 8 are passed with vertical polarization. By controlling which orientation each signal has upon entering the polarization interference filters in each stage, the spatial location of each set of channels can be determined.

4. Flat Top Optical Filter Design

Figure 15:
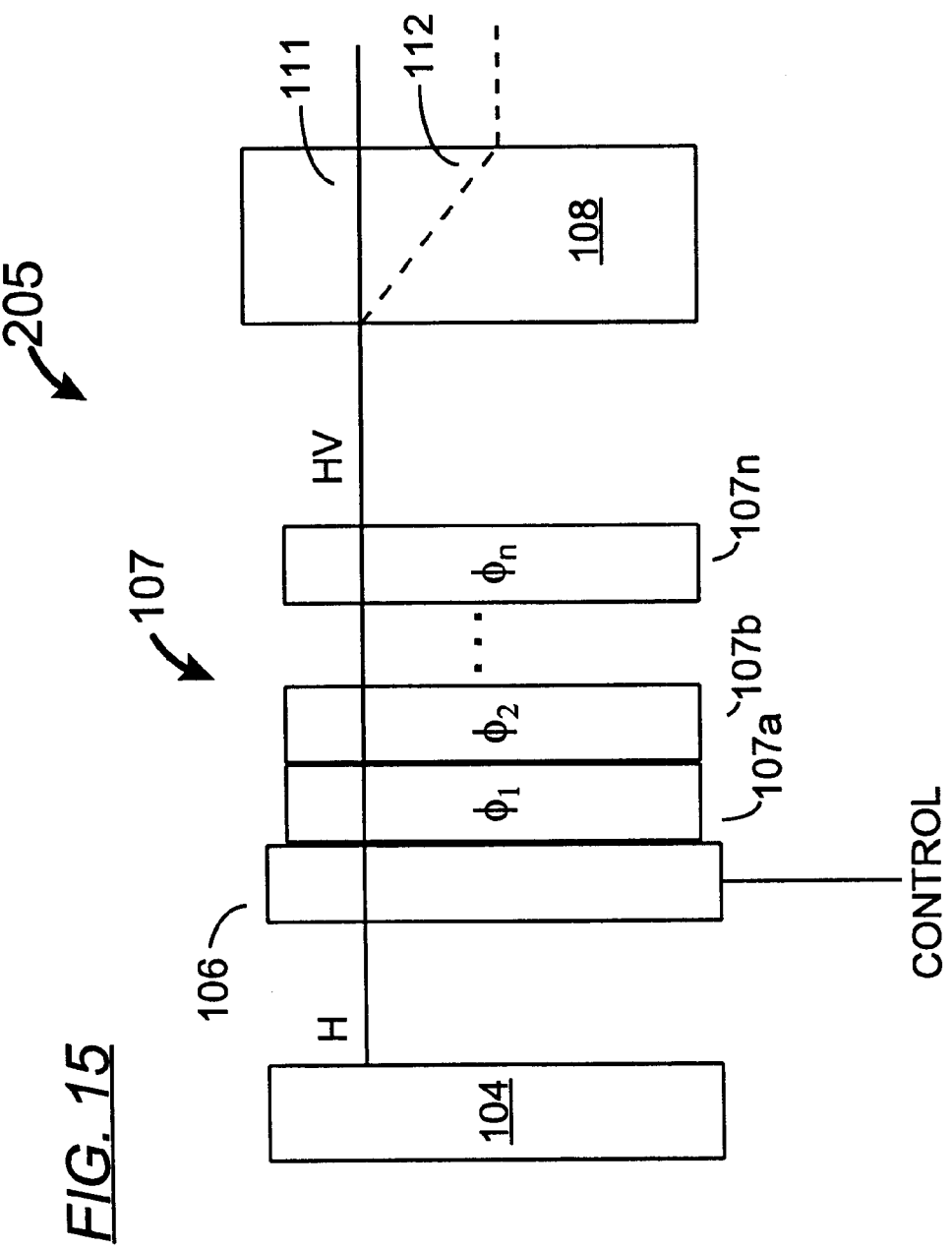
FIG. 15 illustrates in detail a portion of the wavelength filter of FIG. 2 and FIG. 3 in accordance with the present invention; and FIG. 16A

FIG. 15 illustrates in greater detail the construction of a flat top polarization interference filter controlled by polarization converter 106. Filter 205 comprises N cascaded birefringent elements 107 sandwiched by polarization rotator 106 and birefringent elements 104 and 108. Conventional filter design creates a shaped spectral response by sandwiching birefringent elements such as 107A–107N between two polarizers. The conventional design does not offer control which is provided by polarization converter. The conventional design also wastes optical energy by filtering out all energy of a particular polarization at an output polarizer. The present invention conserves this energy using birefringent elements 104 and 108 rather than a conventional polarizer.

Each birefringent element 107A–107N are oriented at a unique optic axis angle with respect to the optical axis of polarization converter 106. Any optical transmission function can be approximated by N terms of a Fourier series. From the coefficients of the approximating Fourier series the impulse response of the filter can be estimated. A filter of N elements allows the approximation of the desired function by N+1 terms of a Fourier exponential series. An example of using five waveplates to synthesize the flat-top spectrum is shown in FIG. 16. By properly orienting the optical axis of the waveplates a relatively flat-top is achieved with a side-lobe compression ratio of 30 dB.

Figure 16A:
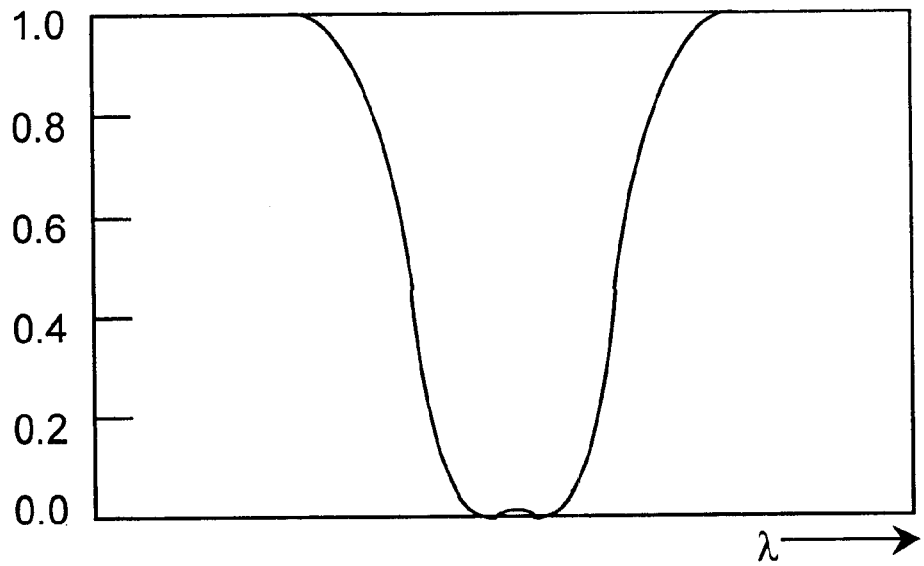
FIG. 16B illustrates a computer simulated pass band of a flat top filter implementation in accordance with the present invention.
Figure 16B:
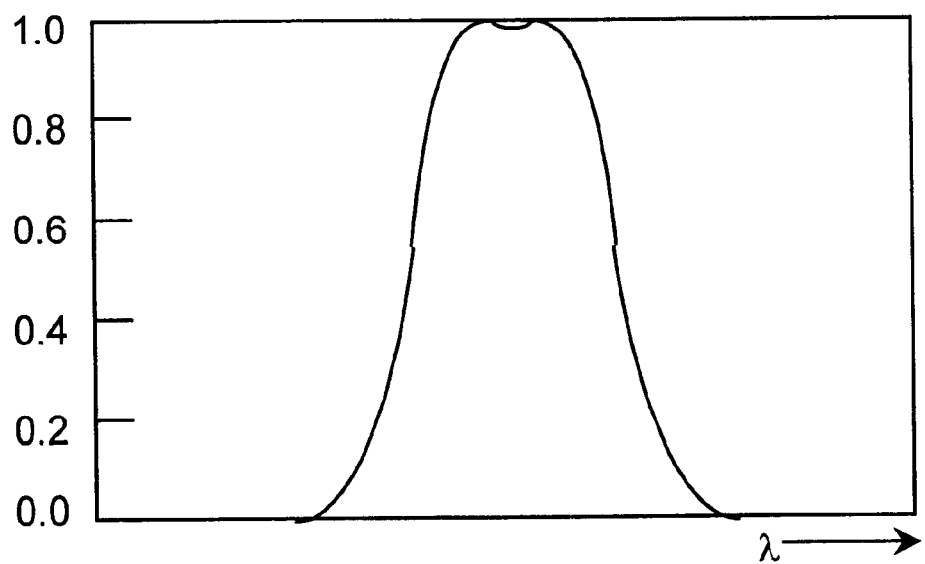

In FIG. 16A and FIG. 16B, the flat top spectra are shown before and after the polarization converter 106 is switched. In FIG. 16A and FIG. 16B the vertical axis represents normalized transmission and the horizontal axis represents wavelength. As seen by comparison of FIG. 16A and FIG. 16B, the two spectra are complimentary to each other, which is one of the key factors in designing the wavelength router. It is because of this orthogonal characteristic that polarization rotator 106 can select either of the spectra and spatially separate them later using birefringent crystals. By increasing the sampling points or the number of waveplates a better transmission function that more closely approximates a flat top transmission with steep transitions is obtained. Theoretically this transmission function can be a perfect square wave shape in the desired spectral bandwidth. Minimum side slopes, 100% transmission, and flat top response are possible. Practically, however, the physical size limits the number of stages a practical device will sacrifice some of the features such as ripple on the top, shallower slope, and side lobe fluctuation.

It should be apparent that a programmable wavelength router that offers fast switching, a simple reliable design, and a scaleable architecture is provided. It is to be expressly understood that the claimed invention is not to be limited to the description of the preferred embodiment but encompasses other modifications and alterations within the scope and spirit of the inventive concept.

What is claimed is:

1. An optical device that separates an input signal into a first output signal having a first spectral band and a second output signal having a second spectral band, wherein the first and second spectral bands are substantially complementary, the optical device comprising:

a first element that spatially separates the input signal into a first beam and a second beam that have orthogonal polarizations;

a wavelength filter having a polarization-dependent optical transmission function such that the first beam is decomposed into a third beam and a fourth beam and the second beam is decomposed into a fifth beam and a sixth beam, wherein the third beam and the fifth beam carry the first spectral band and the fourth beam and the sixth beam carry the second spectral band, and the third beam and the sixth beam have a first polarization and the fourth beam and the fifth beam have a second polarization that is orthogonal to the first polarization; and a second element(s) that combines the third beam and fifth beam to form the first output signal and combines the fourth beam and the sixth beam to form the second output signal.

2. The optical device of claim 1 wherein the input signal comprises a plurality of wavelengths that are associated with arbitrary numbers from 1 to N, and the first output signal comprises the odd numbered wavelengths and the second output signal comprises the even numbered wavelengths.

3. The optical device of claim 1 wherein the wavelength filter comprises a plurality of birefringent components with each component oriented in a predetermined direction.

4. The optical device of claim 3 wherein each of the birefringent components comprise a birefringent material selected from the group consisting of calcite, rutile, $YVO_4$, and $LiNbO_3$.

5. The optical device of claim 3 wherein the plurality of birefringent components comprise a plurality of birefringent waveplates coupled to a birefringent element.

6. The optical device of claim 1 wherein the first element comprises a birefringent element.

7. The optical device of claim 1 wherein the first element comprises a birefringent material selected from the group consisting of calcite, rutile, $YVO_4$, and $LiNbO_3$.

8. The optical device of claim 1 wherein the wavelength filter comprises a plurality of stacked birefringent waveplates coupled to a birefringent element.

9. A method for separating an input signal into a first output signal having a first spectral band and a second output signal having a second spectral band, wherein the first and second spectral bands are substantially complementary, the method comprising:

spatially separating the input signal into a first beam and a second beam that have orthogonal polarizations;

decomposing, according to a polarization-dependent optical transmission function, the first beam into a third beam and a fourth beam, and the second beam into a fifth beam and a sixth beam, wherein the third beam and the fifth beam carry the first spectral band and the fourth beam and the sixth beam carry the second spectral band, and the third beam and the sixth beam have a first polarization and the fourth beam and the fifth beam have a second polarization that is orthogonal to the first polarization; and combining the third beam and fifth beam to form the first output signal; and combining the fourth beam and the sixth beam to form the second output signal.

10. The method of claim 9 wherein spatially separating the input optical signal into first and second beams is performed via a birefringent element.

11. The method of claim 10 wherein the birefringent element comprises a material selected from the group consisting of calcite, rutile, $YVO_4$, and $LiNbO_3$.

12. The method of claim 9 wherein decomposing the first beam into a third beam and a fourth beam, and the second beam into a fifth beam and a sixth beam is performed via a wavelength filter.

13. The method of claim 12 wherein the wavelength filter comprises a plurality of birefringent components, with each component oriented in a predetermined direction.

14. The method of claim 13 wherein the plurality of birefringent components comprise a plurality of birefringent waveplates coupled to a birefringent element.

15. The method of claim 12 wherein the wavelength filter comprises a plurality of stacked birefringent waveplates coupled to a birefringent element.

16. The method of claim 15 wherein each of the birefringent waveplates and the birefringent element comprise a material selected from the group consisting of calcite, rutile, YVO4, and LiNbO3.

17. The method of claim 9 wherein the input signal comprises a plurality of wavelengths that are associated with arbitrary numbers from 1 to N, and the first output signal comprises the odd numbered wavelengths and the second output signal comprises the even numbered wavelengths.

18. An optical device that separates an input signal into a first output signal having a first spectral band and a second output signal having a second spectral band, wherein the first and second spectral bands are substantially complementary, the optical device comprising:

a first element that spatially separates the input signal into a first beam and a second beam;

a wavelength filter having a polarization-dependent optical transmission function such that the first beam is decomposed into a third beam and a fourth beam and the second beam is decomposed into a fifth beam and a sixth beam, wherein the third beam and the fifth beam carry the first spectral band and the fourth beam and the sixth beam carry the second spectral band, the third beam and the fourth beam have orthogonal polarizations, and the fifth beam and the sixth beam have orthogonal polarizations; and a second element(s) that combines the third beam and fifth beam to form the first output signal and combines the fourth beam and the sixth beam to form the second output signal.

19. The optical device of claim 18 wherein the wavelength filter comprises a plurality of stacked birefringent waveplates coupled to a birefringent element.

20. The optical device of claim 18 wherein the third beam and the sixth beam have a first polarization and the fourth beam and the fifth beam have a second polarization that is orthogonal to the first polarization.

21. The optical device of claim 18 wherein the input signal comprises a plurality of wavelengths that are associated with arbitrary numbers from 1 to N, and the first output signal comprises the odd numbered wavelengths and the second output signal comprises the even numbered wavelengths.

22. The optical device of claim 18 wherein the wavelength filter comprises a plurality of birefringent components, with each component oriented in a predetermined direction.

23. The optical device of claim 22 wherein each of the birefringent components comprise a birefringent material selected from the group consisting of calcite, rutile, $YVO_4$, and $LiNbO_3$.

24. The optical device of claim 18 wherein the wavelength filter comprises a plurality of birefringent waveplates coupled to a birefringent element.

25. The optical device of claim 18 wherein the first element comprises a birefringent element.

26. The optical device of claim 18 wherein the first element comprises a birefringent material selected from the group consisting of calcite, rutile, $YVO_4$, and $LiNbO_3$.

27. An optical device comprising:

a first birefringent element positioned to receive a wavelength division multiplexed optical signal, and operable to spatially separate that signal into a first beam and a second beam;

a plurality of birefringent waveplates, coupled to received the first and second beams, and operable to process the first beam such that it carries a first set of wavelengths with a first polarization and a second set of wavelengths with a second polarization orthogonal to the first polarization, and to process the second beam such that it carries the first set of wavelengths with the second polarization and the second set of wavelengths with the first polarization, wherein the first and second sets of wavelengths are substantially complementary;

a second birefringent element coupled to receive the processed first and second beams from the birefringent waveplates, and operable to spatially separate each of the processed first and second beams into two intermediate beams, one for components having the first polarization and another for components having the second polarization; and at least one combining element coupled to receive the intermediate beams from the second birefringent element, and operable to combine the intermediate beams carrying the components of the first beam having the second polarization and the components of the second beam having the first polarization into a first output signal, and to combine the intermediate beams carrying the components of the first beam having the first polarization and the components of the second beam having the second polarization into a second output signal.

28. The optical device of claim 27 wherein the plurality of birefringent waveplates comprises a plurality of stacked birefringent waveplates.

29. The optical device of claim 27 wherein each of the birefringent waveplates comprise a material selected from the group consisting of calcite, rutile, $YVO_4$, and $LiNbO_3$.

30. The optical device of claim 27 wherein the first and second birefringent elements comprise a material selected from the group consisting of calcite, rutile, and $LiNbO_3$.

31. The optical device of claim 27 wherein the first beam and the second beam have orthogonal polarizations and further comprising a polarization converter interposed between the first birefringent element and the birefringent waveplates, the polarization rotator operable to exchange the polarization states of the first beam and the second beam.

32. The optical device of claim 31 wherein the polarization converter comprises a nematic liquid crystal polarization converter.

33. The optical device of claim 27 where the birefringent waveplates are each oriented in a predetermined direction.

* * * * *